United States Patent
Hann

(10) Patent No.: US 6,309,134 B1
(45) Date of Patent: Oct. 30, 2001

(54) RETAINER CATCH ASSEMBLY

(75) Inventor: Mark S. Hann, Shorewood, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/442,903

(22) Filed: Nov. 18, 1999

(51) Int. Cl.⁷ .................................................... F16B 21/06
(52) U.S. Cl. ..................... 403/326; 403/328; 403/321; 403/322.1; 403/282; 296/37.8; 24/460; 24/462
(58) Field of Search .................. 403/326, 327, 403/328, 299, 321, 322.2, 322.1, 325, 274; 24/462, 460, 459, 115 R; 248/314, 316.2, 224.8; 16/252, 253, 257, 266, 296; 296/97.1, 97.11, 37.13, 37.14, 37.8; 174/138 F; 297/188.19

(56) References Cited

U.S. PATENT DOCUMENTS

| | | | |
|---|---|---|---|
| 3,757,031 | * | 9/1973 | Izraeli .............................. 174/138 F |
| 4,118,838 | * | 10/1978 | Schiefer et al. ..................... 24/115 R |
| 4,568,123 | | 2/1986 | Yasui et al. . |
| 4,673,214 | | 6/1987 | Meiller . |
| 4,679,850 | | 7/1987 | Bianchi et al. . |
| 4,759,518 | * | 7/1988 | Yardas .................................... 24/462 |
| 4,779,292 | | 10/1988 | Dabney . |
| 4,934,750 | * | 6/1990 | Eichler et al. ...................... 296/37.8 |
| 4,976,493 | | 12/1990 | Frankila . |
| 5,000,614 | | 3/1991 | Walker et al. . |
| 5,048,996 | | 9/1991 | DuBois et al. . |
| 5,371,925 | * | 12/1994 | Sawatsky ............................... 24/460 |
| 5,732,994 | * | 3/1998 | Stancu et al. ....................... 296/37.8 |
| 5,845,965 | * | 12/1998 | Heath et al. ..................... 297/188.19 |
| 6,003,927 | * | 12/1999 | Korber et al. ...................... 296/37.8 |
| 6,045,173 | * | 4/2000 | Tiesler et al. ....................... 296/37.8 |

\* cited by examiner

Primary Examiner—Lynne H. Browne
Assistant Examiner—Doug Hutton
(74) Attorney, Agent, or Firm—Pauley Petersen Kinne & Fejer

(57) ABSTRACT

A retainer catch assembly includes a receiver having an inner channel and an outer shell and a plurality of detents aligned on each of opposite sides of the outer shell. One or more spring clips are selectably positioned within a detent aligned on each side of the outer shell. A striker is further positioned within the inner channel so that it is removable from the inner channel under an adjustable force depending upon the relative position of the spring clip. The retainer catch assembly may be particularly suited to a vehicle center console wherein a cover is slidable with respect to a compartment and requires that the cover have an adjustable removal force depending upon the position of the cover relative to the compartment.

12 Claims, 3 Drawing Sheets

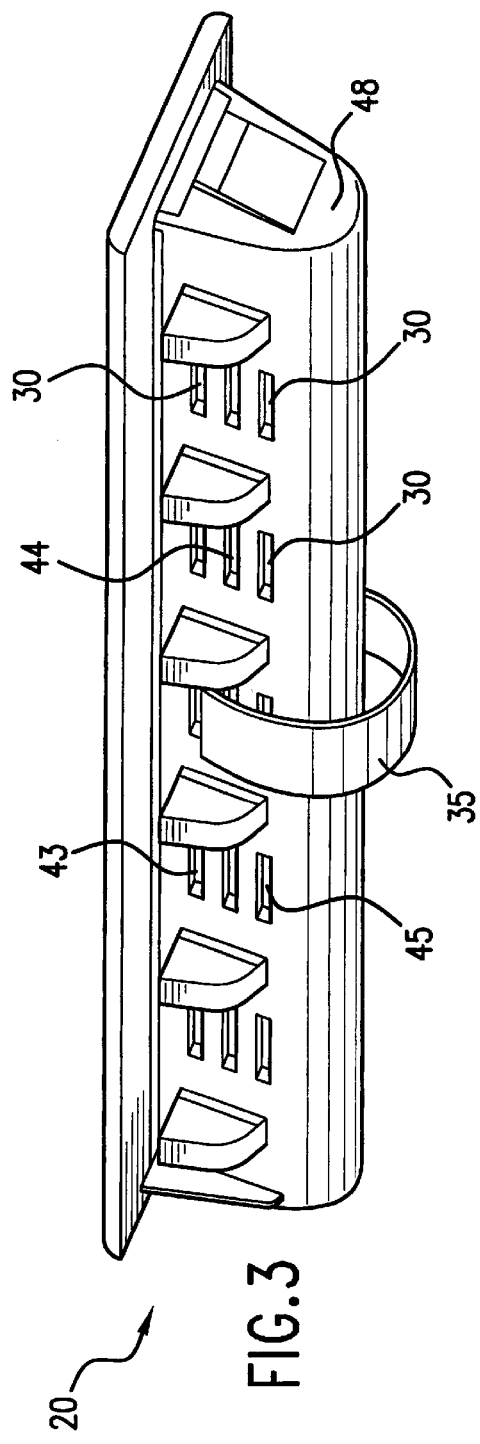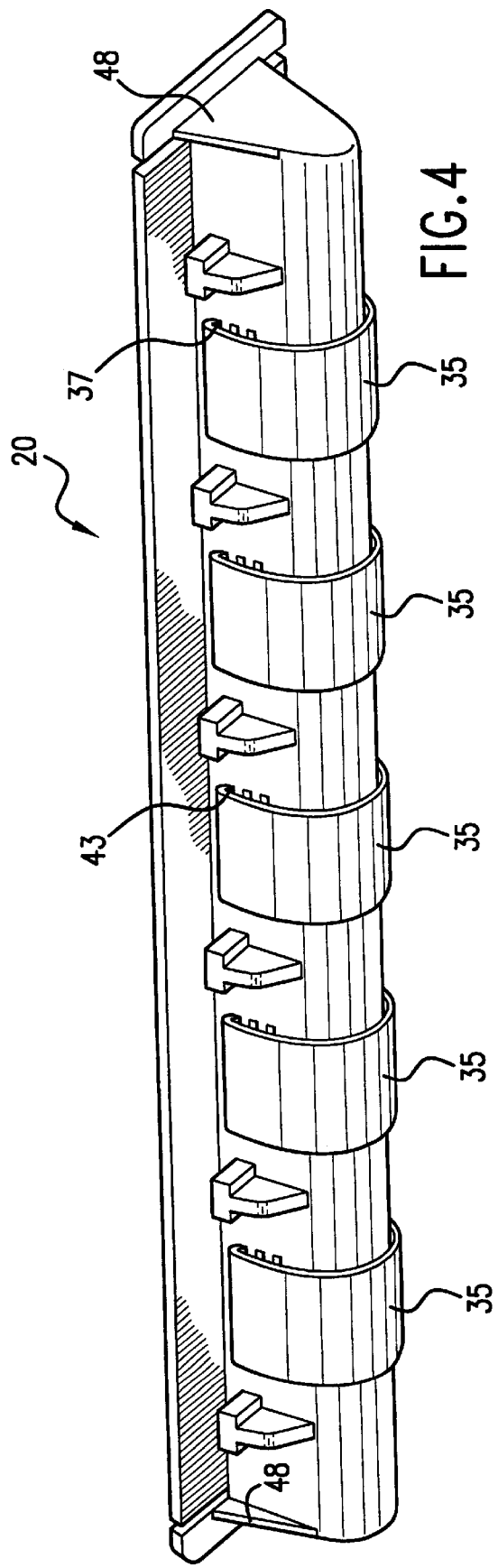

RETAINER CATCH ASSEMBLY

BACKGROUND OF THE INVENTION

1. Field of the Invention

This invention relates to a retainer catch assembly having one or more configurable spring clips, the retainer catch assembly particularly adaptable to a vehicle center console.

2. Description of Related Art

Retainer catch assemblies are often used in automotive applications such as glove compartments, center console compartments and other compartments requiring a latched cover or retainer. Different applications clearly require different removal forces depending upon the location, function and composition of the relevant components. In general, prior art retainer catch assemblies are manufactured for a specific application and are not selectably adaptable for use in other applications.

Therefore there is a need for a retainer catch assembly wherein the force of removal of the latch from the receiver may be selectably adjustable during the manufacturing process.

SUMMARY OF THE INVENTION

A retainer catch assembly according to one preferred embodiment of this invention comprises a striker and a corresponding receiver having an inner channel and an outer shell.

A plurality of detents are preferably positioned on each of opposite sides of the outer shell, preferably in one or more aligned columns of two or more detents per column.

The retainer catch assembly further includes one or more spring clips that are each selectably positioned within a pair detents on opposite sides of the outer shell. Therefore, each spring clip preferably requires a spaced pair of detents for engagement.

When the spring clip is engaged with the outer shell, the compressive force of the spring clip preferably results in a narrowing, however slight, of the inner channel within the receiver. Therefore, depending upon the spring force exhibited by the spring clip, a width of the inner channel can be controlled by the relative position of the spring clip on the outer shell. Outer edges of the spring clip may be positioned in detents in one of at least a first position and a second position within the outer shell. In the first position, towards a top of the outer shell, the spring clip exerts a greater compressive force on the outer shell then in the second position lower down on the outer shell.

One or more columns of detents may be positioned, preferably in vertical alignment, on each side of the outer shell thereby permitting variable compressive forces along the length of the inner channel.

The striker engages with the inner channel and becomes more difficult to remove as the inner channel is narrowed. The striker may be connected with respect to a cover or any other component that requires mating engagement with receiver.

The striker may be slideably positioned within the inner channel so that the striker is slideable along a sliding axis of motion and removable in an axis perpendicular to such sliding axis.

According to one preferred embodiment of this invention, the retainer catch assembly is used in connection with a center console including a cover slidable positioned with respect to a compartment. The receiver is preferably positioned within the compartment and the striker is positioned with respect to the cover.

The striker is slidable within the inner channel of the receiver and removable from the inner channel under an adjustable force depending upon the relative position of the spring clips on the outer shell of the receiver. The striker and thus the cover may then be removable from the receiver under an adjustable force depending upon the relative position of the cover with respect to the compartment. This may be accomplished by placing spring clips in the second position in one or more columns, thus making the cover more easily removable at some slidable positions, and in the first position in one or more other columns, thus making the cover more difficult to remove at other slidable positions.

It is one object of this invention to provide a retainer catch assembly wherein the force of removal of the latch from the receiver may be selectably adjustable during the manufacturing process.

It is another object of this invention to provide a retainer catch assembly wherein a spring clip is selectably engageable with one of a plurality of detents.

It is yet another object of this invention to provide a retainer catch assembly having a striker that is slideably adjustable with respect to a receiver.

It is still another object of this invention to provide a retainer catch assembly wherein the striker is removable under selectably varying forces depending upon the position of the striker with respect to the receiver.

It is yet another object of this invention to provide a retainer catch assembly adaptable for use in connection with a center console having a cover and a compartment.

BRIEF DESCRIPTION OF THE DRAWINGS

The above-mentioned and other features and objects of this invention will be better understood from the following detailed description taken in conjunction with the drawings wherein:

FIG. 3 is a perspective side view of a receiver according to one preferred embodiment of this invention;

FIG. 4 is a perspective side view of a receiver according to one preferred embodiment of this invention;

DESCRIPTION OF PREFERRED EMBODIMENTS

Figure 1:
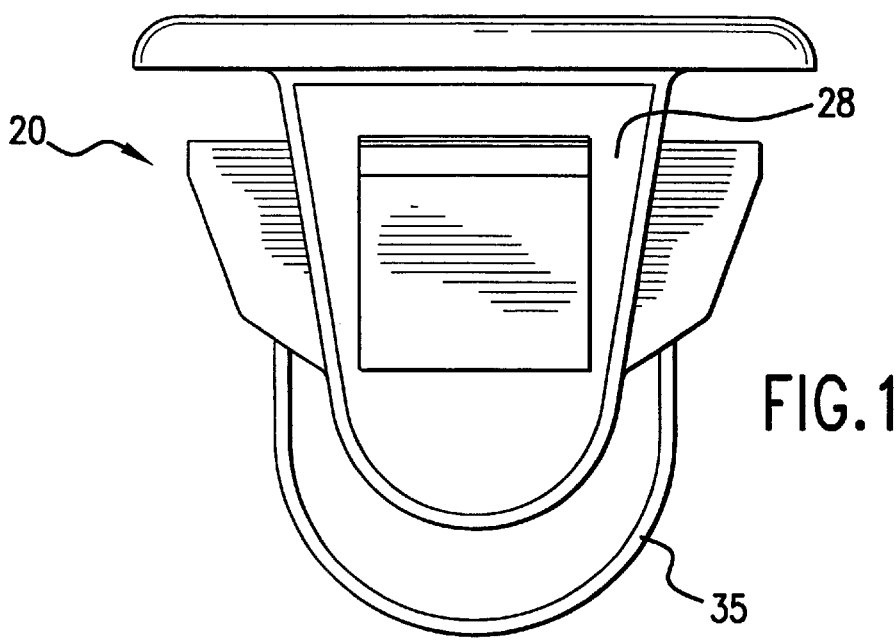
FIG. 1 is a front view of a receiver and a spring clip according to one preferred embodiment of this invention.
Figure 2:
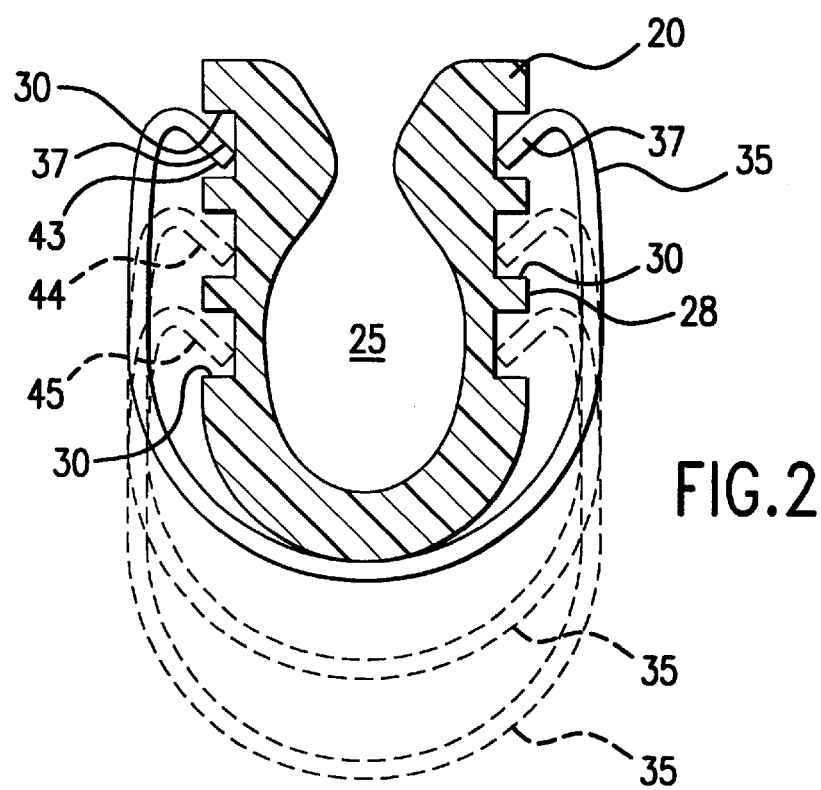
FIG. 2 is a cross-sectional front view of a receiver and a spring clip in a first position according to one preferred embodiment of this invention.

A retainer catch assembly according to one preferred embodiment of this invention is shown in FIGS. 1 and 2. The retainer catch assembly preferably comprises receiver 20 having inner channel 25 and outer shell 28. Receiver 20 is preferably molded from a thermoplastic material such as nylon, or specifically ZYTEL® plastic.

Receiver 20 is preferably positioned within compartment 55 or any other component that requires engagement with another component, such as a cover. Receiver 20 is preferably positioned within such component such that only inner channel 25, and not outer shell 28, is exposed.

A plurality of detents 30 are preferably positioned on each of opposite sides of outer shell 28. According to one preferred embodiment of this invention, detents 30 are aligned on either side of outer shell 28, although alternative groupings of detents 30 may also be used.

According to another preferred embodiment of this invention, the retainer catch assembly includes receiver 20 having an elongated outer shell 28 and correspondingly elongated inner channel 25. According to this preferred embodiment of the invention, the plurality of detents 30 are arranged in a plurality of spaced columns on each of opposite sides of the elongated outer shell 28, as shown in FIGS. 3 and 4.

The retainer catch assembly further includes one or more spring clips 35, each spring clip 35 is preferably selectably positioned within a pair of detents 30 on opposite sides of outer shell 28. Spring clip 35 is preferably a metal band or other resilient bias means having two outer edges 37, each outer edge 37 selectably engaged with a single detent 30. Therefore, each spring clip 35 preferably requires a spaced pair of detents 30 for engagement. Spring clip 35 is preferably positioned in curved alignment with outer shell 28.

When spring clip 35 is engaged with outer shell 28, the compressive force of spring clip 35 preferably results in a narrowing, however slight, of inner channel 25 within receiver 20. Therefore, depending upon the spring force exhibited by spring clip 35, a width of inner channel 25 can be controlled by spring clip 35.

Further, the compressive force of spring clip 35 may be artificially adjusted by selecting an alternative position on outer shell 28 with the arrangement of detents 30. As shown in FIG. 2, outer edges 37 of spring clip 35 may be positioned in detents 30 in one of a first position 43, a second position 44 or a third position 45. In the first position 43, spring clip 35 exerts a greater compressive force on outer shell 28 than in the second position 44. Likewise, when spring clip 35 is in the second position 44, spring clip exerts a greater compressive force on outer shell 28 than in the third position 45. Additional positions may be created with the placement of additional detents 30 in outer shell 28.

As shown in FIGS. 2–4, one or more columns of three detents 30 are positioned, preferably in vertical alignment, on each side of outer shell 28. Although columns of three detents 30 are shown, outer shell 28 may include any arrangement of two or more detents 30 per side of outer shell 28 to permit adjustable compressive force on outer shell 28.

Figure 6:
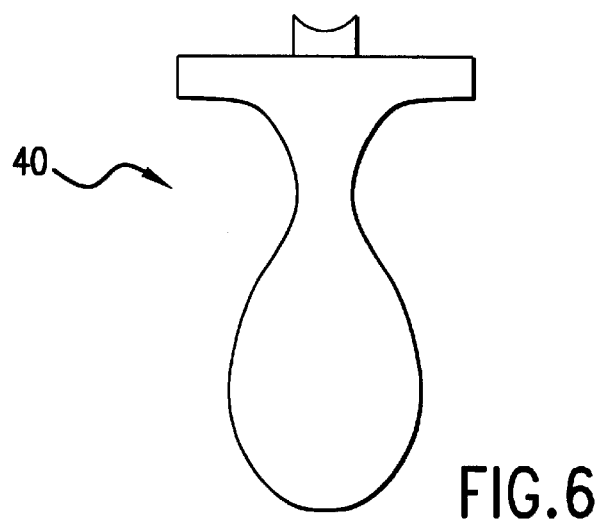
FIG. 6 is a front view of a striker according to one preferred embodiment of this invention.

The retainer catch assembly further comprises striker 40 which engages with inner channel 25, shown in FIG. 6 in one preferred embodiment. Striker 40 is preferably a tapered bulb or other configuration that engages with inner channel 25. Striker 40 preferably includes an outer contour that conforms with a contour of inner channel 25. According to one preferred embodiment of this invention, as inner channel 25 is narrowed, striker 40 requires greater efforts to engage and disengage with inner channel 25. Striker 40 is preferably connected with respect to cover or any other component that requires mating engagement with receiver 20.

According to one preferred embodiment of this invention, striker 40 is slideably positioned within inner channel 25. Preferably, striker 40 is slidable along a sliding axis of motion and removable in an axis perpendicular to such sliding axis. According to one preferred embodiment of this invention, striker 40 requires a greater removal force to disengage from inner channel 25 when spring clip 35 is in a first position 43 than when the spring clip is in a second position 44.

According to this preferred embodiment of the invention, a separate spring clamp 35 is preferably engaged in one or more columns in one of the three detents 30 on each side of outer shell 28. As shown in FIG. 3, a single spring clamp 35 may be engaged with outer shell 28, or alternatively, as shown in FIG. 4, a separate spring clamp 35 may be engaged with each column of detents 30 in outer shell 28.

According to one preferred embodiment of this invention, endwall 48 is positioned at each end of inner channel 25. Such a spaced arrangement prevents striker 40 from becoming lodged within inner channel 25, especially at the extremities of inner channel 25.

Figure 5:
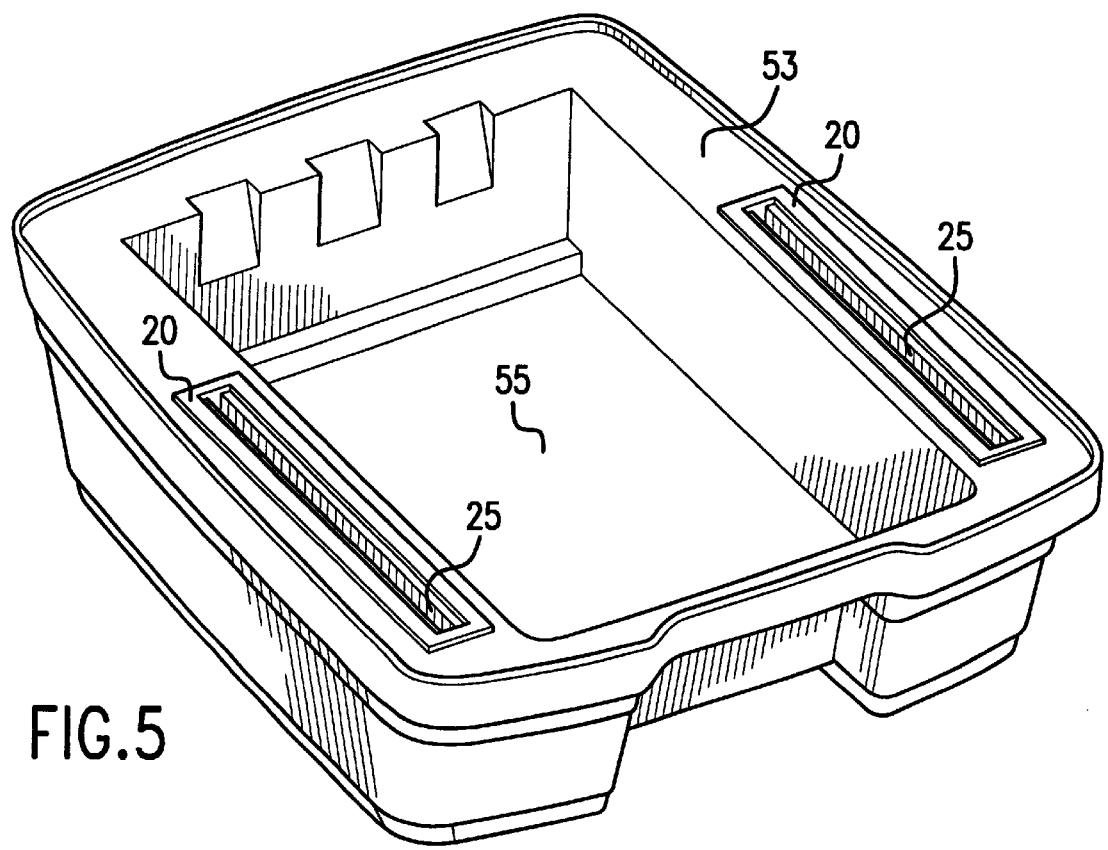
FIG. 5 is a perspective top view of a compartment according to one preferred embodiment of this invention.

According to one preferred embodiment of this invention, retainer catch assembly is used in connection with a center console, such as between front seats in an automobile. The center console may include a cover slidable positioned with respect to a compartment, such as compartment 55 shown in FIG. 5. Such a slidable relationship is required, for instance, when the cover is also used as an armrest which must slide together with the seat.

Receiver 20 is preferably positioned within sidewall 53 of compartment 55. Receiver 20 includes inner channel 25 and an elongated outer shell 28. As described above, a plurality of detents 30 are preferably aligned on each of opposite sides of elongated outer shell 28. A plurality of spring clips 35 are selectably positioned so that each outer edge 37 is positioned in a detent 30 aligned on each side of elongated outer shell 28.

Striker 40 is preferably positioned within the cover which is slidably engaged with the compartment. As such, striker 40 is slidably positioned within inner channel 25 and removable from inner channel 25 under an adjustable force depending upon the relative position of spring clip 35.

In addition, striker 40 and thus the cover may be removable from receiver 20 under an adjustable force depending upon the relative position of the cover with respect to compartment 55. This may be accomplished in a preferred embodiment of receiver 20 having an elongated inner channel 25 and a plurality of columns of detents 30. Spring clips 35 may be placed in a third position in some columns, thus making the cover more easily removable at some slidable positions, and in the first and/or second positions in other columns, thus making the cover more difficult to remove at other slidable positions. This variable removal force may be helpful as the cover slides with respect to compartment 55 because of the changing pivot point of the cover with respect to compartment 55.

While in the foregoing specification this invention has been described in relation to certain preferred embodiments thereof, and many details have been set forth for purpose of illustration, it will be apparent to those skilled in the art that the retainer catch assembly according to this invention is susceptible to additional embodiments and that certain of the details described herein can be varied considerably without departing from the basic principles of the invention.

I claim:
1. A retainer catch assembly comprising:
   a receiver having an inner channel and an outer shell;
   a plurality of detents aligned on each of opposite sides of an outer surface of the outer shell;
   a spring clip having two outer edges, each outer edge selectably engaged with a detent, wherein an inner surface of the spring clip is positioned around the outer surface of the outer shell to expose the inner channel; and a striker engaged with the inner channel, the striker requiring a greater removal force to disengage from the inner channel dependent upon a relative position of the spring clip.

2. The retainer catch assembly of claim 1 wherein the plurality of detents are arranged in a plurality of columns along the outer shell.

3. The retainer catch assembly of claim 1 wherein a column of three detents is positioned in vertical alignment on each side of the outer shell.

4. The retainer catch assembly of claim 1 wherein an inner surface of the spring clip is positioned in curved alignment with an outer surface of the outer shell.

5. A retainer catch assembly comprising:

a receiver having an inner channel and an elongated outer shell;

a plurality of detents arranged in a plurality of spaced columns on each of opposite sides of the elongated outer shell;

a plurality of spring clips, each spring clip selectably positioned within a separate spaced column of detents; and a striker positioned within the inner channel wherein the striker requires a greater removal force to disengage from the inner channel when the spring clip is in a first position than when the spring clip is in a second position.

6. The retainer catch assembly of claim 5 further comprising a striker slidably positioned within the inner channel.

7. The retainer catch assembly of claim 5 wherein the plurality of columns each comprise three detents positioned in vertical alignment on each side of the outer shell.

8. The retainer catch assembly of claim 7 wherein a spring clip of the plurality of spring clips is engaged in each column in one of the three detents on each side of the outer shell.

9. The retainer catch assembly of claim 5 further comprising an endwall positioned at each end of the inner channel.

10. A retainer catch assembly comprising:

a receiver having an inner channel and an elongated outer shell;

three detents arranged in a plurality of spaced columns aligned on each of opposite sides of the elongated outer shell;

a plurality of spring clips, each spring clip of the plurality of spring clips selectably positioned in each spaced column within one of the three detents aligned on each side of the elongated outer shell;

a striker slideably positioned within the inner channel, the striker removable from the inner channel under an adjustable force depending upon the relative position of each spring clip.

11. A center console having a cover slidably positioned with respect to a compartment, the center console comprising:

a receiver positioned within a sidewall of the compartment, the receiver having an inner channel and an elongated outer shell;

a plurality of detents aligned on each of opposite sides of the elongated outer shell;

a plurality of spring clips, each spring clip selectably positioned in a detent aligned on each side of the elongated outer shell;

a striker positioned within the cover, the cover slidably positioned within the inner channel and removable from the inner channel under an adjustable force depending upon the relative position of the spring clip.

12. A center console having a cover slidably positioned with respect to a compartment, the center console comprising:

a receiver positioned within a sidewall of the compartment;

a plurality of spring clips positioned around an outer surface of the receiver;

a striker within the cover slidably positioned within the receiver and removable from the receiver under an adjustable force depending upon the relative position of the cover with respect to the compartment.

* * * * *